(12) United States Patent
Alexander et al.

(10) Patent No.: US 11,995,292 B1
(45) Date of Patent: May 28, 2024

(54) SYSTEM AND METHOD FOR TRANSMISSION INDUCED OBJECT LEVELING, ALIGNMENT AND DATA SHARING

(71) Applicant: Tracer Imaging LLC, Ossining, NY (US)

(72) Inventors: James Alexander, Mount Kisco, NY (US); Ryan Kelly, Scarsdale, NY (US); Steven M. Spiro, Chappaqua, NY (US)

(73) Assignee: TRACER IMAGING LLC, Ossining, NY (US)

( * ) Notice: Subject to any disclaimer, the term of this patent is extended or adjusted under 35 U.S.C. 154(b) by 408 days.

(21) Appl. No.: 17/354,722

(22) Filed: Jun. 22, 2021

Related U.S. Application Data

(60) Provisional application No. 63/042,302, filed on Jun. 22, 2020.

(51) Int. Cl.
| | |
|---|---|
| *G06F 3/0484* | (2022.01) |
| *G01B 21/16* | (2006.01) |
| *G01B 21/22* | (2006.01) |
| *G01C 9/06* | (2006.01) |
| *G06F 9/4401* | (2018.01) |
| *G06K 7/10* | (2006.01) |
| *G06Q 10/0631* | (2023.01) |

(Continued)

(52) U.S. Cl.
CPC ........... *G06F 3/0484* (2013.01); *G01B 21/16* (2013.01); *G01B 21/22* (2013.01); *G01C 9/06* (2013.01); *G06F 9/4418* (2013.01); *G06K 7/10297* (2013.01); *G06K 7/10386* (2013.01); *G06Q 10/06315* (2013.01); *G06Q 30/0643* (2013.01); *G06T 19/006* (2013.01); *G06V 20/20* (2022.01); *G01C 2009/066* (2013.01); *H04M 1/0202* (2013.01)

(58) Field of Classification Search
None
See application file for complete search history.

(56) References Cited

U.S. PATENT DOCUMENTS

| | | | | |
|---|---|---|---|---|
| 2016/0164694 | A1* | 6/2016 | Hyun | H04L 41/00 348/14.08 |
| 2020/0355498 | A1* | 11/2020 | Manfreda | G01B 5/24 |
| 2021/0295604 | A1* | 9/2021 | Xiu | H04N 13/117 |

FOREIGN PATENT DOCUMENTS

KR 101740645 B1 * 5/2017 ............... A61B 6/58

OTHER PUBLICATIONS

Title: ES1000 Laser Distance Measure; Author: Ryobi Phone Works; DateOct. 27, 2014; Source: https://www.manualslib.com/manual/1023318/Ryobi-Phone-Works-Es1000.html (Year: 2014).*

(Continued)

*Primary Examiner* — Jwalant Amin
(74) *Attorney, Agent, or Firm* — Leason Ellis LLP

(57) ABSTRACT

A system and method provide for processing, by a mobile computing device, information received from a transmission device to identify the transmission device, an object, or the transmission device and the object, wherein the transmission device is configured to be coupled to or embedded within the object. The mobile computing device provides, as a function of the at least one of the accelerometer and the gyroscope, a representation that the mobile computing device is determined to be level, wherein the representation that the mobile computing device is level is usable to level the object.

14 Claims, 7 Drawing Sheets

(51) Int. Cl.
  *G06Q 30/0601* (2023.01)
  *G06T 19/00* (2011.01)
  *G06V 20/20* (2022.01)
  *H04M 1/02* (2006.01)

(56) References Cited

OTHER PUBLICATIONS

Title: LevelMatePro—Wireless Vehicle Leveling System—User Manual; Author: LogicBlue Technology; Date: Sep. 25, 2017; Source: https://staging.logicbluetech.com/user-manuals/Source: https://www.youtube.com/watch?v=-gTybeMOy1l (Year: 2017).*

* cited by examiner

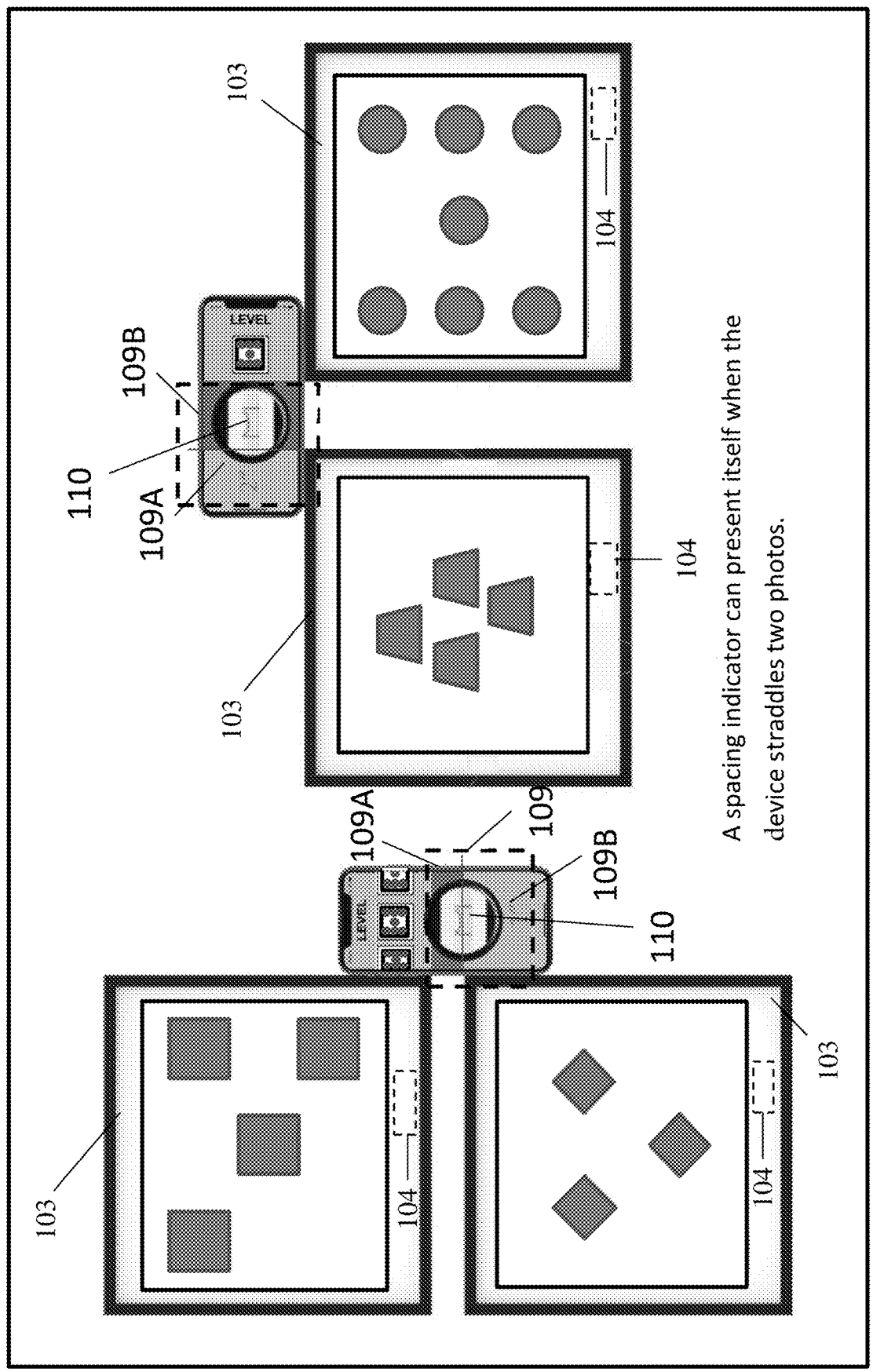

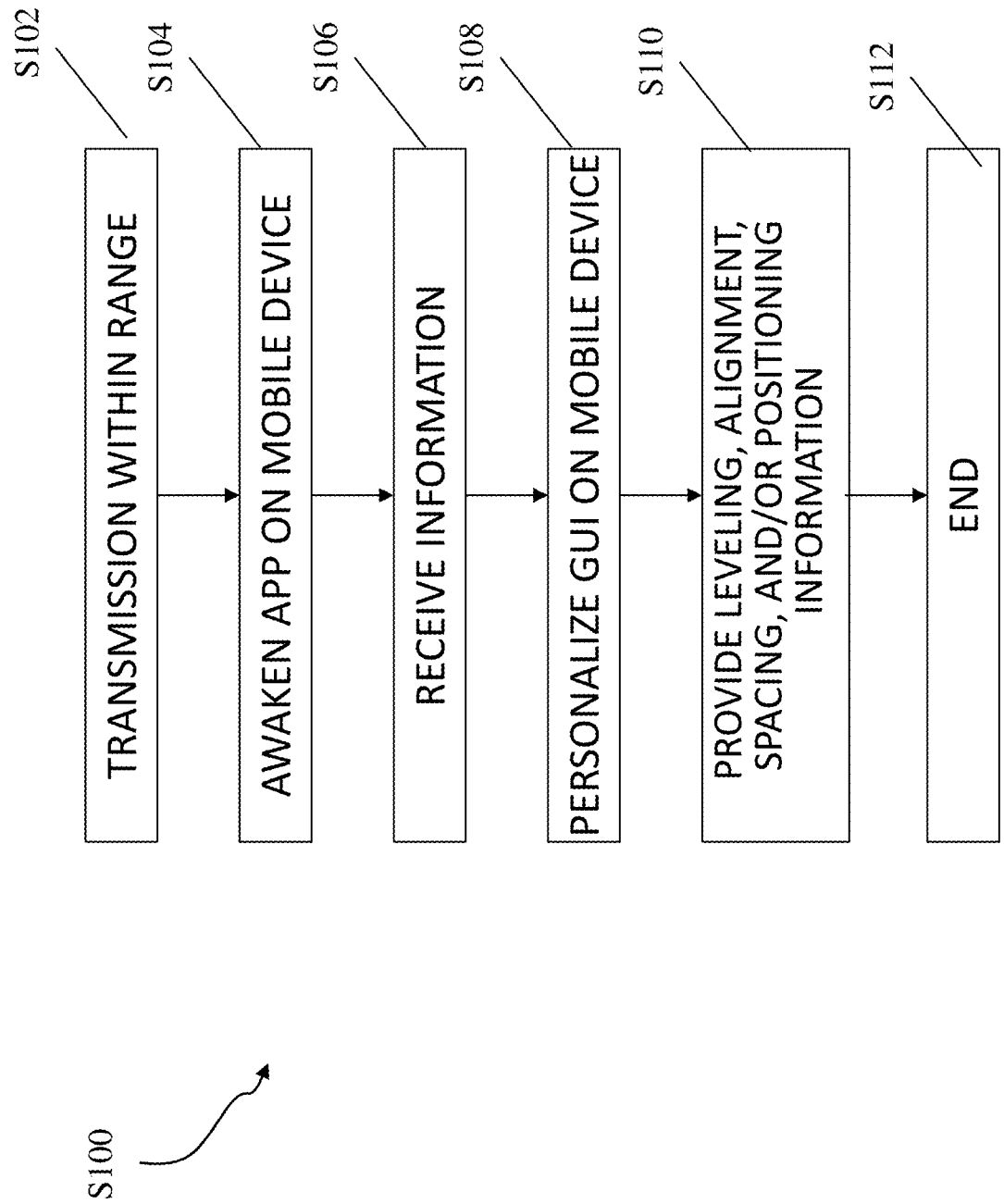

SYSTEM AND METHOD FOR TRANSMISSION INDUCED OBJECT LEVELING, ALIGNMENT AND DATA SHARING

CROSS-REFERENCE TO RELATED PATENT APPLICATIONS

This application is based on and claims priority to U.S. Provisional Patent Application 63/042,302, filed Jun. 22, 2020, the entire contents of which is incorporated by reference herein as if expressly set forth in its respective entirety herein.

FIELD

The present invention is directed, generally, to object placement and, more particularly, to technological improvements associated with object leveling, spacing, positioning, and alignment.

BACKGROUND

Many objects are hung or positioned in particular ways that require vertical, horizontal, and/or surface leveling. For example, wall décor (e.g., photographs, paintings, and other hangings), building materials, furniture, manufacturing equipment, scientific gear, tri-pods, stands, or the like, often require vertical, horizonal or surface leveling to function correctly or have a desired aesthetic appearance. Typically, leveling is accomplished by a physical leveling tool such as a "spirit" or "bubble" level or other leveling mechanism that is physically separate from the object or integrated into the object itself, such as a spirit bubble.

Recently, leveling can been accomplished by using a smartphone configured with a mobile software application (a "mobile app"). The mobile app can access information from a three-axis accelerometer and/or other sensors configured with the smartphone and generate a digital representation of a level on the smartphone's display screen. In operation, a user places the smartphone running the mobile app adjacent to (e.g., on top of) the object requiring leveling, and the user can see changes on the smartphone's screen in real-time as (s)he adjusts the orientation of the object to get it leveled, as desired.

Despite the widespread availability of physical levels and recent advances in leveling technology, operating physical and/or virtual levels can be impractical or difficult. Physical levels, for example, often get misplaced, or are too small or long for a given application. Further, bubble levels are often limited to indicating whether a surface is level horizontally, vertically, or at a 45-degree angle. Virtual levels, such as provided in mobile apps, often require Internet bandwidth or are inconvenient to operate.

It is with respect to these and other considerations that the disclosure made herein is presented.

BRIEF SUMMARY

In one or more implementations, a system and method provide for processing, by a mobile computing device, information received from a transmission device to identify the transmission device, an object, or the transmission device and the object, wherein the transmission device is configured to be coupled to or embedded within the object. The mobile computing device provides, as a function of the at least one of the accelerometer and the gyroscope, a representation that the mobile computing device is determined to be level, wherein the representation that the mobile computing device is level is usable to level the object.

In one or more implementations, the computing device can be configured to provide a graphical user interface via the display screen that includes at least one representation of the object.

In one or more implementations, a computerized system and method are provided that use information generated by a mobile computing device to provide leveling information. A mobile computing device has at least a processor, a communication device, a display screen, and at least one of an accelerometer and a gyroscope. A transmission device is located separately from the mobile computing device and configured to transmit at least information that can be received by the mobile computing device, wherein the transmission device is configurable to be coupled to or embedded within an object. A mobile app is configured to execute on the mobile computing device, wherein, when executing by the mobile computing device, the mobile app configures the mobile computing device to: process the information received from the transmission device to identify the transmission device, the object, or the transmission device and the object; receive, from at least one other computing device via the communication device, information associated with the object; provide a graphical user interface via the display screen that includes at least one representation of the object; and provide, via the graphical user interface as a function of the at least one of the accelerometer and the gyroscope, a representation that the mobile computing device is determined to be level, wherein the representation that the mobile computing device is level is usable to level the object.

In one or more implementations, the mobile app configures the mobile computing device to display an image of the object.

In one or more implementations, the mobile app configures the mobile computing device to identify physical dimensions of the object, measure a distance between the object and another object, and provide, via the graphical user interface, a representation of the distance.

In one or more implementations, the mobile app configures the mobile computing device to provide at least one audible feedback and haptic feedback when the mobile computing device is determined to be level.

In one or more implementations, the mobile app configures the mobile computing device to operate the mobile app in a suspended mode until the mobile computing device receives the information from the transmission device, awaken the mobile app automatically upon receiving the information.

In one or more implementations, the mobile app configures the mobile computing device to provide for registration of the object upon an initial awakening of the mobile app.

In one or more implementations, the transmission device is a near field communication tag or a radio frequency identification tag, and/or includes a passive transmitted or an active transmitter.

In one or more implementations, the mobile app configures the mobile computing device to display a graphical representation in the graphical user interface of a guide for leveling, aligning, spacing, and/or positioning the object.

In one or more implementations, the graphical representation is provided at least in part as a function of augmented reality.

In one or more implementations, the augmented reality provides a representation to ensure the objects are level, aligned and equally spaced.

In one or more implementations, the augmented reality superimposes virtual frames for gallery wall planning and marketing.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which:

FIG. 6 illustrates features associated with leveling, alignment, spacing, and/or positioning an object in accordance with an example implementation of the present disclosure; and FIG. 7 is a flowchart illustrating example steps that are associated with an implementation of the present application.

DETAILED DESCRIPTION

Figure 1:
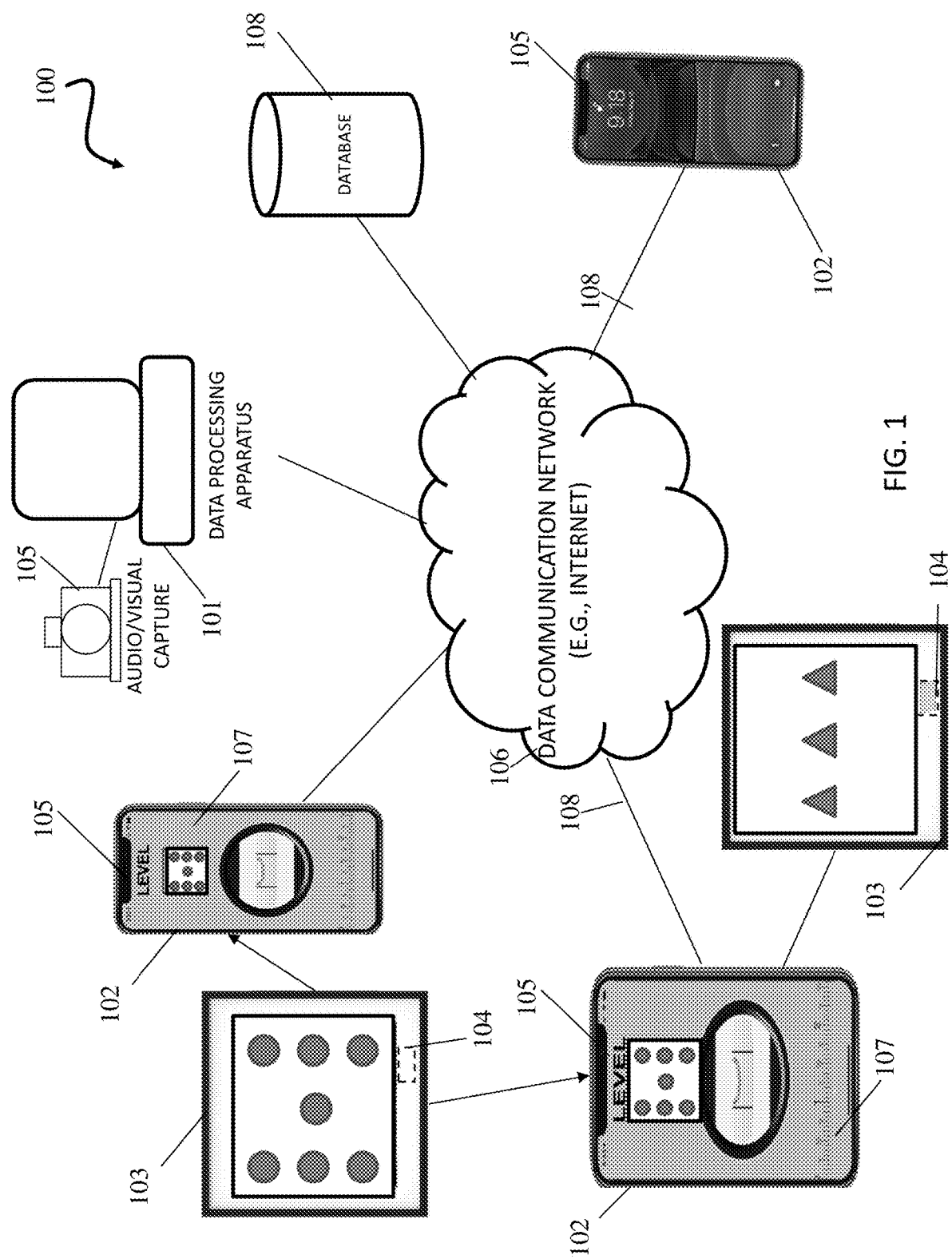
FIG. 1 is a diagram illustrating an example hardware arrangement that operates for providing the systems and methods disclosed herein.

By way of introduction, the present disclosure provides a technological improvement associated with object leveling, positioning, spacing, and/or alignment. In one or more implementations, the present disclosure provides computerized systems and methods that include a mobile computing device that processes information received from a passive or active transmission device. For example, the mobile computing device can receive information via one or more remotely placed transmission devices, such as radio-frequency identification ("RFID") tags that are embedded or otherwise coupled to an object. In one or more implementations, one or more sensors can be configured with a mobile computing device to read a RFID tag when the RFID tag is within close proximity to the mobile computing device. The tag(s) can be placed within or can be coupled to an object, such as a picture frame, shelving, or virtually any object that needs to be level, aligned, or otherwise positioned in a particular way. In one or more alternative implementations of the present disclosure, a RFID or other tag can be substituted with a quick response ("QR") code, and a camera configured with a mobile computing device can be used to capture an image of the QR code and receive information associated with the product. Such an implementation is instead of (or in addition to), for example, using a radio tag to identify a product and/or layout.

In addition to information received from a RFID tag or other transmission device, a mobile computing device configured in accordance with the present disclosure uses information from a gyroscope, accelerometer, and/or other sensors configured with the mobile computing device to determine orientation, movement, and positioning information. Using the information, the mobile computing device can provide information regarding leveling, alignment, spacing, and/or positioning, and provide the information on the display configured with the device.

The present disclosure provides leveling, alignment, spacing, and/or positioning functionality automatically as a function of a mobile computing device, such as a smartphone, that is configured by executing a mobile app. Alternatively, the mobile computing device can access an Internet website and, once connected, can provide functionality associated with leveling, alignment, spacing, and/or positioning, substantially as shown and described herein. This alternative implementation precludes a need for a mobile device to download and install a mobile app for operating in accordance with the teachings herein.

In one or more implementations of the present disclosure, the mobile app operates in the background of the mobile computing device, essentially in a suspended mode or "sleep" state. Upon the mobile computing device detecting a radio signal associated with a transmission device shown and described herein, the mobile app awakens from the sleep state and launches automatically. This provides an advantage over an existing virtual level mobile app that require users to manually launch the app to perform leveling operations.

Thus, the present disclosure can utilize information from a radio emitting device (such as an active or passive RFID chip or near field communication ("NFC") tag), which can be coupled to or embedded in an object requiring leveling, alignment, spacing, and/or positioning, and a mobile app that provides leveling, alignment, spacing, and/or positioning functionality. The mobile app can provide such functionality in a graphical user interface (a "GUI"), such as shown and described herein, or may provide such functionality more discreetly. For example, information regarding leveling, alignment, spacing, and/or positioning can be provided as a simple audible tone, a vibration, or other feedback that is not graphic-based nor provided in a GUI.

Moreover, the present disclosure supports storing and/or retrieving information from cloud-based or otherwise remote data storage. For example, after a mobile computing device (e.g., a smartphone) detects a radio signal from a transmission device coupled to (or embedded within) an object, some information can be received from the transmission device (e.g., an identification code). The mobile computing device can be configured to transmit the information to a device associated with cloud-based (or other) storage to receive additional information, such as the object that the transmission device is coupled to (or embedded within). Thus various kinds of information can be accessed by the mobile computing device, such as the model or other information about the object, images of the object, a customer identifier, information about the user/customer, location, terrain, weather, or any other data that can assist in leveling, alignment, spacing, placement, or the like. Such information is usable by the mobile computing device, for example, to customize or personalize a GUI operating on the mobile computing device. For example, the GUI can use the information to display an image of frame being leveled along with a photograph virtually included in the frame.

In addition, information received from transmission device and/or from a remote storage device, such as model number, customer information, and geographic location can be used to track the object being leveled. In addition to tracking, such information can assist parties associated with manufacturing, including to reduce errors and improve quality control. Furthermore, providing information as a function of transmission devices (e.g., RFID or NFC tags) can help operations in warehouses and retail settings, such as for inventory management, tracking, location, and handling returns. For example, if a radio-enabled object is to be returned, the return process can be initiated from the computing device configured with the mobile app. In operation, for example, the user brings the so-configured mobile computing device within range of the object, and processes associated with the return are automatically provided via the mobile app. Furthermore, a transmission device (e.g., a RFID or NFC tag) embedded in or coupled to an object can be used in production, warehousing, shipping, retailing, inventorying, and returning of the object. Specifically, orders with multiple objects can be ensured to contain the right objects and are packaged in the correct order.

It is to be further appreciated that while many of the descriptions and illustrations herein regard embedding or attaching one or more transmission devices to an object, the invention is not limited to such an arrangement. One or more transmission devices can be, instead or in addition, embedded in or coupled to any packaging, carton, box, container, plastic, case, sleeve, bubble wrap, Styrofoam, or virtually anything else an object comes in or with.

In any event, information can be received partly (or completely) from a transmission device, or can be at least partly received from a device associated with cloud-based (or other) storage.

In one or more implementations, information associated with a transmission device 104, such as a product name, purchase information, or other information associated with the device 104, is received or stored by a mobile computing device 102 prior to the mobile computing device 102 receiving a signal from the transmission device 104. For example, when a photo frame is assembled by a manufacturer with a user's photograph, information associated with the frame, the photograph, and the respective tag is provided to the mobile computing device 102 without any signal transmitted by the transmission device 104 and received by the mobile computing device 102. This approach eliminates latency and a requirement for any internet or other network connectivity. In one or more implementations of the present disclosure, a mobile app executing on a mobile computing device 102 assigns one or more tag IDs for each photograph during placement of an order. This approach eliminates a need for additional network bandwidth for users who are involved in an ordering process, such as ordering a photo frame. The network ID provided by the mobile app can be encoded in a tag, such as a NFC tag. Various elements set forth in the GUI operating on the mobile computing device 102, such as the thumb, wall layout, etc., can be provided in advance in the mobile app executing on the user's mobile computing device 102.

In one non-limiting example, a photo printing company embeds an NFC tag encoded with a unique identifier in a framed photograph. The unique identifier represents, among other things, the specific photograph appearing in the frame that was ordered by a customer. When the user hangs his/her photo, (s)he places a mobile computing device (e.g., a smartphone) configured with a mobile app along an edge of the frame having the embedded NFC tag. As the mobile computing device comes within transmission range of the NFC tag, the mobile computing device detects the radio signal which causes the mobile computing device "awaken" and launch a mobile app automatically for leveling functionality. In the present example, the mobile app is provided by the photo printing company, and was used by the customer to order the framed photograph. Continuing with this example, an image of the framed photograph being hung appears on the display screen of the mobile computing device. This feature informs the user that the correct photograph is being hung, and that the photograph is being hung correctly. This feature is particularly useful and advantageous over known systems when hanging many framed photographs on a wall and in a pre-determined layout.

In addition to leveling, a mobile computing device configured by executing a mobile app in accordance with the teachings herein can provide information associated alignment and spacing, such as by straddling the configured mobile computing device between two framed photographs with a ruler or simple spacing guide appearing on display screen of the mobile computing device. This feature provides quick and convenient leveling and spacing. Additional features are supported herein, such as configuring the mobile app to detect the transmission device (e.g., the NFC tag in the present example) and, thereafter, automatically download a digital file of the image and provide corresponding information about the photograph, its contents (e.g., who is in the photograph), as well as to take other steps, such as order prints of the photograph, leave a note (e.g., with augmented reality ("AR") tags), contact the owner, or the like. Furthermore, in one or more implementations a user with a mobile computing device configured as shown and described herein and that is with range of a transmission device configured with a framed photograph could download a digital image of the photograph, access information about the photograph, share the image on social media, send the image to their own cloud storage (e.g., iPhoto, Google Photos, DropBox, Flickr, etc.), order prints, purchase a print, leave a virtual note (with AR tags), leave a voice or video note, contact the owner, visit a webpage, or the like.

It is recognized herein that some or all of the options described above can be restricted in cases where security measures are in place, such as encryption and secured sessions that preclude information associated with a transmission device (e.g., RFID tag) and, similarly, a photograph or other object. For example, users can restrict what others can do with their mobile computing devices configured with a mobile app shown and described herein, after their devices come into contact with a respective object. For example, in the case of photographs, a user might enable or disable the ability for people download the image, enable or disable ordering prints, enable or disable leaving comments, or the user can provide other information about the image including related website(s), image location, date, price, or the like.

In one or more implementations of the present disclosure, including regarding multiple photographs and visuals, leveling functionality provided as a function of a mobile computing device can include the ability to use LIDAR, depth sensors and other capabilities to provide augmented reality (AR) and display photographs, frames and other wall mounted objects which may or may not be level, aligned, spacing, or distributed appropriately, or otherwise placed in correct order. In one or more implementations, data for the latter can reside locally, such as in the mobile app on the mobile computing device. As noted above, one mobile app can be used for various functions in addition to leveling, aligning, spacing, and/or positioning, including to order photographs, create a layout for hanging, and/or be accessed from the internet-based service. Objects that are misaligned, not level, or otherwise not placed correctly can be shown on the mobile computing device with a visual indicator, such as a red box or red field, superimposed around or over the object. Haptic and audio signals can also be used to draw the user's attention to a misalignment.

In one or more implementations of the present disclosure, a mobile computing device configured by executing a mobile app (or instructions stored elsewhere, such as via an Internet web site) can render a graphic to indicate that a specified edge of the mobile computing device is level. Such graphic can be a virtual representation of a level, spirit bubble, or other physical leveling device or mechanism. While many of the illustrations and descriptions herein regard representations of bubble levels, the present disclosure supports virtually any graphical, audible, textual, haptic, or other representation of a leveling mechanism or process. As noted above, the computing device can be configured to communicate leveling, alignment, spacing, and/or positioning information in ways other than graphically, such as numerically, via haptics (e.g., vibrations/taps/clicks), audibly (e.g., a voice of virtual assistant), or any combination thereof. The computing device can aid the user to understand when the mobile computing device is level, aligned, spaced, and/or positioned properly, as well as, correspondingly, the object to be leveled, aligned, spaced, and/or positioned that is adjacent to computing device.

Moreover, a mobile computing device configured by a mobile app (or the like) in accordance with the present disclosure can render a visual guide in a GUI provided via the device's display screen. The visual guide is usable to space objects (e.g., picture frames) while the mobile computing device straddles two objects. The visual guide can be adjusted by the user, such as to be expanded when more space is desired between objects, and thinned when less space is desired. In addition to the visual guide, a leveling indicator can be displayed in or hidden from the GUI while the user is spacing objects. Alternatively, or in addition, the so-configured mobile computing device can detect the edge of one or more objects being spaced, and provide a visual, haptic, and/or audio signal to alert the user of proper or improper leveling, alignment, spacing, and/or positioning.

In one or more implementations of the present disclosure, a mobile computing device configured by executing a mobile app (or the like) can render in a GUI provided via the device's display screen an image of the object being leveled, aligned, spaced, and/or positioned (and/or other related objects) to provide a visual confirmation to the user that the object is correct. For example, as a user hangs multiple photographs in accordance with a known layout, the images on either side (or above and below) the photo being leveled can also be rendered on screen to confirm proper leveling, alignment, spacing, and placement of the photograph.

In one or more other implementations regarding photographs and/or visuals, images of as-yet unprinted photographs in suggested frames can be provided virtually for a user. For example, as a user is confirming alignment, spacing, and leveling of a photograph hung on a wall, the mobile computing device executing a mobile app can superimpose such virtual representations of framed pictures in detected empty spaces on the wall. This feature provides an improvement over known leveling applications and assists users to see how these objects would actually look in that environment. Coupons or other forms of offers can be presented in the mobile app, and e-commerce functionality can be integrated into the mobile app for convenient, e.g., one tap, ordering. Various examples of wall data, images, offers, or the like can be stored remotely, such as in cloud storage, for future use, which can save bandwidth and improve performance of the mobile computing device.

In any event, it is to be appreciated that the present disclosure leverages augmented reality technologies in supported devices in new and exciting ways. For example, users can use their computing devices in accordance with the teachings herein to view a wall of photos and visuals, including to see videos, moving live photos or motion from which the original photographs in objects configured as shown and described herein were taken.

Referring now to the figures, in which like reference numerals refer to like elements, Referring to FIG. 1 a diagram is provided of an example hardware arrangement that operates for providing the systems and methods disclosed herein, and designated generally as system 100. System 100 can include one or more mobile computing devices 102 that are at least communicatively coupled to one or more transmission devices 104 that can be coupled to or embedded within objects 103. Transmission device 104 can include any device capable of short-range (e.g., up to 3 feet, although potentially several yards) communications, and is typically a passive transmitter, such as a high frequency NFC tag or RFID tag. Transmission device 104 can be configured to transmit unique identification information associated with the device 104 and/or object to which device 104 is associated.

Although many of the examples and implementations shown and described herein include transmission device coupled to or embedded in object 103, the present disclosure is not intended to limit devices 104 to pre-installation. For example, transmission devices 104 can be added to objects 103 retroactively, post-manufacturing, and/or by users and others at any time to enable the functionality shown and described herein with objects 103 in the future. For example, transmission device 104 can be provided as an unassigned radio-emitting device that, when recognized by mobile computing device 102, causes a mobile app 107 to launch automatically and commence a registration process. For example, a user can register the object 103, including by adding a photo of the object (from which dimensions would be determined), and other data the user wants to assign the object 103.

Mobile computing device 102 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, mobile computing device 102 can be a network computer or an embedded processing apparatus within another device or consumer product or consumer electronic product. Mobile computing devices 102 can be configured with one or more cameras (e.g., front-facing and rear-facing cameras), a microphone, a microprocessor, and a communications module(s).

Mobile computing devices 102 can be configured to communicate across communication network 106 with one or more data processing apparatuses 101 and other mobile computing devices 102. Data processing apparatus 101 can be configured to provide information and/or instructions (e.g., web sites, software, and/or mobile apps) that can be accessed and used by mobile computing devices 102 to configure mobile computing devices 102 to perform features, such as those shown and described herein. Further, data processing apparatuses 101 and/or mobile computing devices 102 can be configured to access or include one or more databases 108, which can store information associated with the present disclosure, such as materials, images, inventory, customers, users, locations, terrain, weather, and other topic associated with providing functionality shown and described herein. It is contemplated that data processing apparatuses 101 and mobile computing devices 102 can access any required databases via communication network 106 or any other communication network to which the devices have access. Data processing apparatus 101 can communicate with devices comprising databases using any known communication method, including a direct serial, parallel, universal serial bus ("USB") interface, or via a local or wide area network.

Mobile computing devices 102 communicate with data processing apparatuses 101 and/or other mobile computing devices 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

Accordingly, mobile computing devices 102 preferably have the ability to send and receive data across communication network 106, and are equipped with web browsers, mobile apps, or other technology, to provide received data on display devices incorporated therewith. As illustrated in FIG. 1, mobile computing devices 102 can be configured with mobile app 107, which configures mobile computing device 102 to operate and provide functionality shown and described herein. Although in the present disclosure mobile app 107 is shown and in various drawings and described herein with reference thereto, mobile app 107 is not limited to a particular one mobile app, but rather includes at least some of the functionality shown and described herein. For example, mobile app 107, in one context, can be provided by a furniture manufacturer and include leveling functionality shown and described herein, as well as other features, such as information regarding assembly, ordering, purchasing, or the like. In another context, mobile app 107 can be provided by a photo printing company and includes leveling, alignment, positioning, spacing, and other functionality particular to the photo printing company.

It is further to be understood that the hardware arrangement of the present disclosure is not limited to devices that are physically wired to communication network 106 or each other, and that wireless communication can be provided between devices and components shown and described herein. In one or more implementations, the present application provides improved processing techniques to prevent packet loss, to improve handling interruptions in communications, and other issues associated with wireless technology.

System 100 preferably includes software that provides functionality described in greater detail herein, and preferably resides on one or more data processing apparatuses 101 and/or mobile computing devices 102. One of the functions performed by data processing apparatus 101 is that of operating as a web server and/or a web site host. Data processing apparatuses 101 typically communicate with communication network 106 across a permanent i.e., un-switched data connection 108. Permanent connectivity ensures that access to data processing apparatuses 101 is always available.

Figure 2:
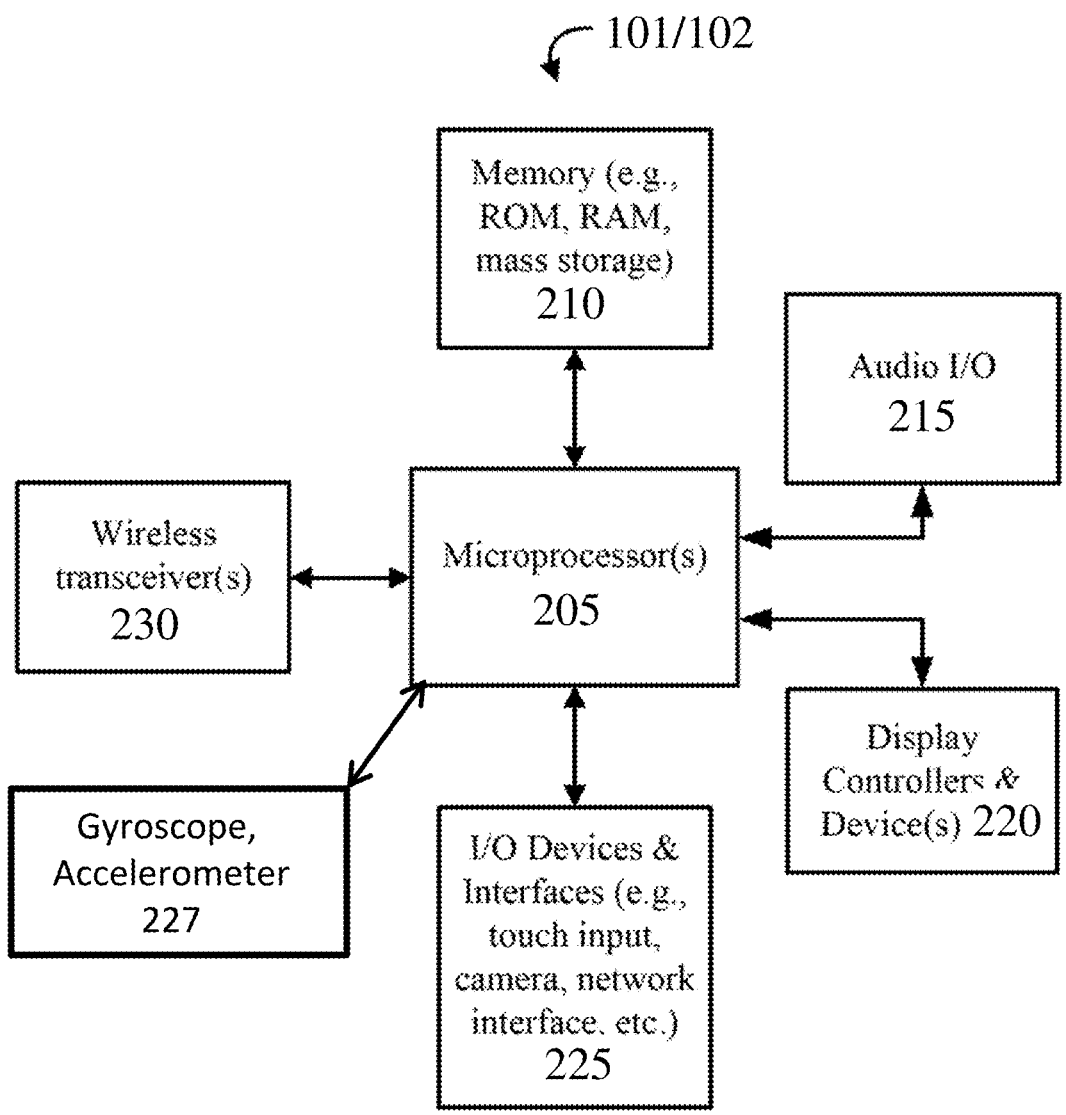
FIG. 2 is a block diagram that illustrates functional elements of a computing device in accordance with an embodiment.

FIG. 2 illustrates, in block diagram form, an exemplary mobile computing device 102 that can provide various functionality, as shown and described herein. Although not expressly indicated, one or more features shown and described with reference to FIG. 2 can be included with or in the audio/visual capture device 105, as well. Mobile computing device 102 may include one or more microprocessors 205 and connected system components (e.g., multiple connected chips).

In one or more implementations, mobile computing device 102 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type. Mobile computing device 102 also includes an audio input/output subsystem 215 which may include one or more microphones and/or speakers.

A display controller and display device 220 provides a visual user interface for the user; this user interface can include a graphical user interface which, for example, is usable for a device when running iOS or ANDROID operating system software.

Mobile computing device 102 can also include one or more wireless transceivers 230, such as an IEEE 802.11 transceiver, an infrared transceiver, a Bluetooth transceiver, a wireless cellular telephony transceiver, or another wireless protocol to connect the mobile computing device 102 with another device or external component (e.g., transmission device 104), or a network. It will be appreciated that one or more buses, may be used to interconnect the various modules in the block diagram shown in FIG. 2. In addition, it will be appreciated that certain protocols or applications require permissions to launch or be launched in specific orders, such as in connection with the NFC protocol. One of ordinary skill will recognize and account for any such circumstances and/or requirements, depending upon a respective implementation of the present disclosure.

The data processing apparatus 101 and/or mobile computing device 102 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 101 and/or mobile computing device 102. The I/O devices and interfaces 225 may include a connector for a dock or a connector for a USB interface, FireWire, etc. to connect the system 100 with another device, external component, or a network.

Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to provide information, such as relating to leveling, alignment, spacing, and positioning, as shown and described herein.

It will be appreciated that additional components, not shown, may also be part of the data processing apparatus 101 and/or mobile computing device 102, and, in certain embodiments, fewer components than that shown in FIG. 2 may also be used in data processing apparatus 101 and/or mobile computing device 102. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 101 and/or mobile computing device 102.

Figure 3:
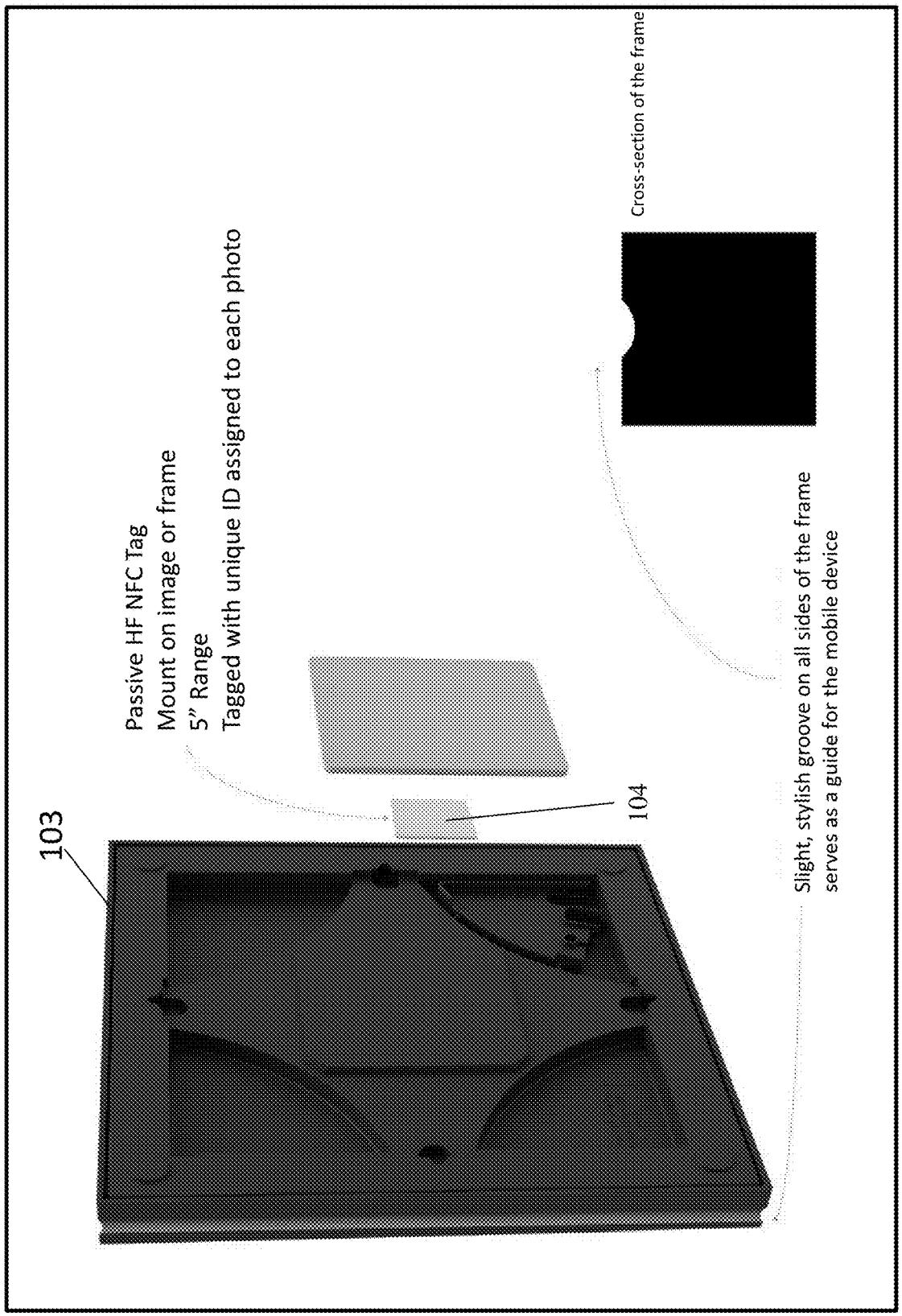
FIG. 3 illustrates an example object that is a picture frame, and configured with a transmission device, in accordance with an example implementation.

FIG. 3 illustrates an example object 103 that, in FIG. 3 is a picture frame, that is configured with transmission device 104. The example transmission device 104 shown in FIG. 3 is a passive high frequency NFC tag that is mounted on a photograph or frame (i.e., object 103). Further, a unique identification assigned to the photograph is associated with the transmission device 104, and transmitted by transmission device 104 to mobile computing device 102 during operations. It is to be recognized that while the example implementation shown in FIG. 3 illustrates a single transmission device 104, a plurality of transmission devices 104 can be provided with a single article (e.g., a frame). Moreover, one or more transmission devices 104 can be positioned practically anywhere on an article, thereby eliminating a need for particular orientation or positioning of an article. In one or more implementations, the transmission device 104 can be configured as a short range radio device, and placing one or more transmission devices 104 strategically can eliminate a need for particular orientation or positioning of an article.

The example frame shown in FIG. 3 includes a cutout portion (e.g., a groove) that can be provided on one or more sides of the frame to serve as a guide for the mobile computing device 102 during leveling, alignment, spacing, and/or positioning. Accordingly, the present disclosure supports providing features for the mobile computing device 102 to sit, align, grip, attach or otherwise temporarily connect to an object 103 during use of mobile app 107. In addition to a cutout portion, a groove, channel, ridge, slot, magnetic connector, or other physical guide can be configured on the object 103 to assist the user with placing or securing mobile computing device 102 during operations.

Figure 4:
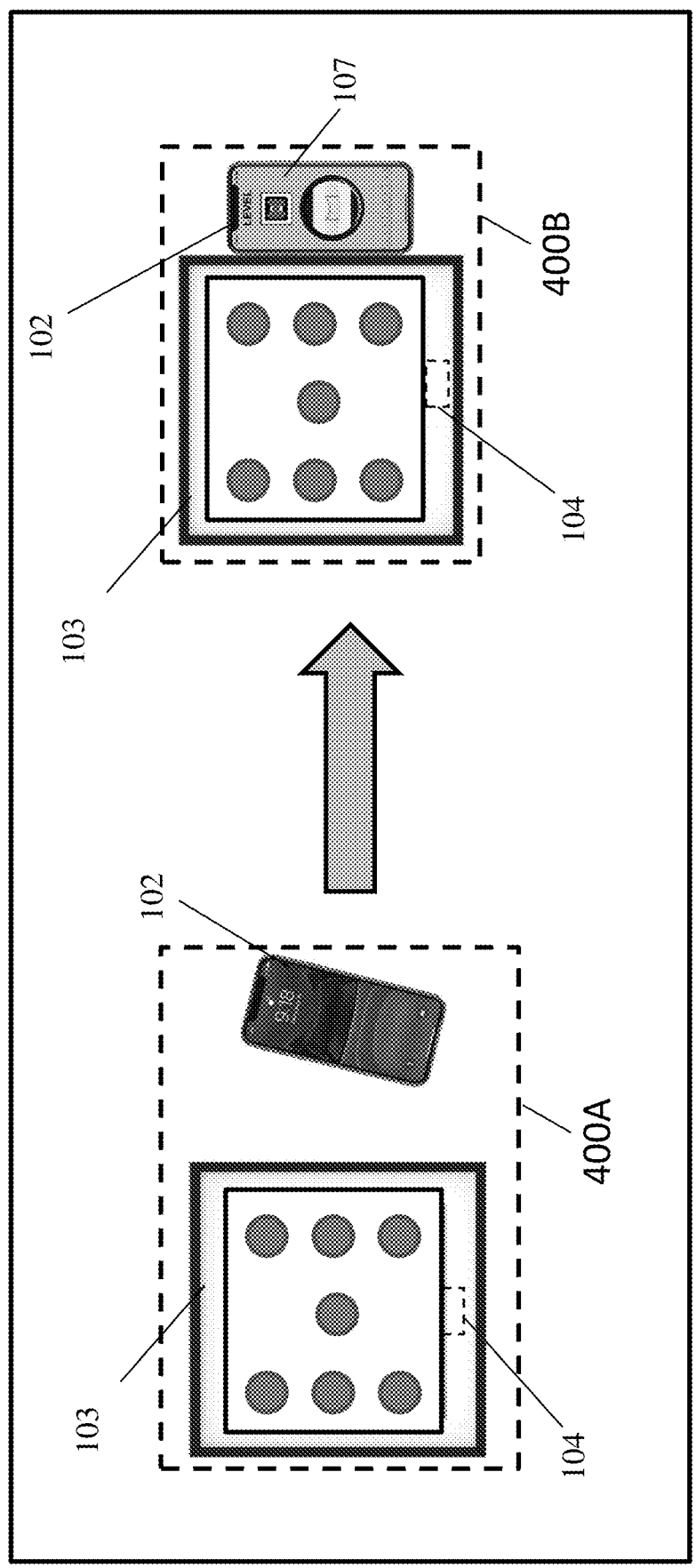
FIG. 4 illustrates an example object configured with a transmission device and a mobile computing device in a sequence of operations, in accordance with an example implementation of the present disclosure.

As noted herein, in one or more implementations of the present disclosure the mobile app 107 can operate in the background of the mobile computing device 102, essentially in a sleep state. Upon mobile computing device 102 detecting a signal associated with a transmission device 104, typically because the mobile computing device 102 is within transmission range of the transmission device 104, the mobile app 107 awakens from the sleep state and launches automatically, including to provide a GUI or other interface. FIG. 4 illustrates a sequence of such an operation. In the block 400A, the mobile computing device 102 is shown with the mobile app 107 and corresponding GUI not yet launched, as computing device 102 is beyond transmission range from transmission device 104, which is configured with or within object 103 (shown as a framed picture). In the block 400B, the mobile computing device 102 is shown with the mobile app 107 and corresponding GUI launched, as computing device 102 has moved within transmission range from transmission device 104. Thus, and as illustrated in FIG. 4, the mobile computing device 102 can operate to launch mobile app 107 automatically upon being within range of transmission device 104.

Figure 5:
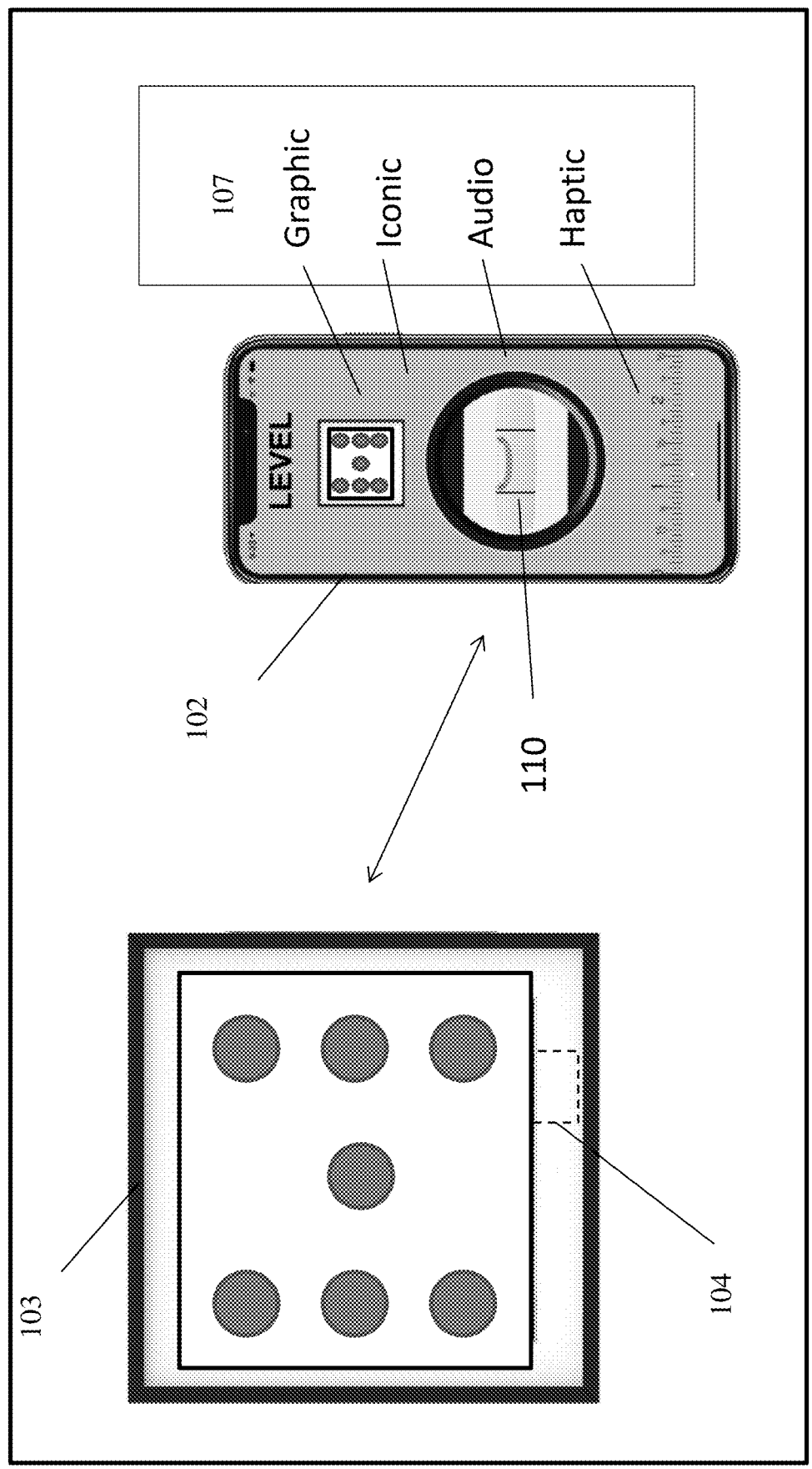
FIG. 5 illustrates an example mobile computing device and mobile app executing thereon, and shows example interface options in accordance with one or more implementations of the present disclosure.

Once launched, mobile app 107, depending on a particular implementation, can provide various features and options for interfacing with a user. For example and as shown in FIG. 5, mobile app 107, when executing on mobile computing device 102, can interface with a user, for example, graphically (e.g., a GUI), via one or more icons (e.g., to provide information without launching the mobile app 107 and/or associated GUI), audibly (e.g., via beeps, alarms, and/or voice interface), and via haptics (e.g., vibrations or other physicality). The GUI shown in mobile app 107 includes a bubble level 110 that is graphical represented. Bubble level 110 provides an easily recognizable representation of showing that mobile computing device 102 is level.

FIG. 6 illustrates features associated with leveling, alignment, spacing, and/or positioning an object 103 in accordance with an example implementation of the present disclosure. As shown in FIG. 6, four objects 103 have been leveled, aligned, spaced, and/or positioned using the mobile computing device 102 that is configured in accordance with the teachings herein, including via mobile app 107. In the example shown in FIG. 6, the GUI provided via mobile app 107 includes spacing indicator 109 to provide information to the user representing an amount of space between objects 103 that are configured with transmission devices 104. In the example shown in FIG. 6, spacing indicator includes graphic shaded portion 109A and numeric portion 109B. Graphic shaded portion 109A identifies, graphically, a representation of the distance spaced between objects 103. Numeric portion 109B identifies, more precisely, the distance spaced between objects 103 (measured in inches in the example shown in FIG. 6). In the left-most example, the two framed pictures are shown to be one inch apart (bottom side of top object 103 from top side of bottom object 103), while the in the right-most example, the two framed pictures are shown to be two inches apart (right side of left object 103 from left side of right object 103). Thus, as shown and described in FIG. 6, two representations of distance (graphical and numeric) are provided for interfacing spacing information with users. One of ordinary skill will recognize that other graphic display features can be included with mobile app 107 to provide information associated with leveling, alignment, spacing, and/or position objects 103. For example, and as shown in FIG. 6, a bubble level 110 is graphical represented in mobile app 107.

FIG. 7 is a flowchart illustrating example steps S100 that are associated with an implementation of the present application. It should be appreciated that several of the logical operations described herein can be implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.). Accordingly, the operations described herein are referred to variously as operations, structural devices, acts, and/or modules. Various of these operations, structural devices, acts and modules can be implemented in software, firmware, special-purpose digital logic, and any combination thereof. It should also be appreciated that more or fewer operations can be performed than those in the figures described herein. These operations can also be performed in a different order than as described herein.

In the example steps shown in FIG. 7, a process S100 is associated with a computerized system and method that uses information generated by a mobile computing device to provide leveling, alignment, spacing, and/or positioning information. At step S102, the mobile computing device 102 moves into transmission range of transmission device 104. Thereafter, the mobile app 107 operating on the mobile computing device 102 awakens from a sleep state (step S104). Information, such as a unique identifier representing an object 103 associated with the transmission device 104 is received by the mobile computing device 102 (step S106). In one or more implementations, the mobile computing device 102 can communicate with the data processing apparatus 101 and receive information that is usable by the mobile computing device 102 to personalize (e.g., color, add/change content, or other personalization) a GUI provided on the mobile device 102. In addition or in the alternative, some or all of information can reside locally within mobile computing device 102, such as in instances where the mobile computing device 102 was used to order photographs for a frame or is otherwise associated with an account or order. The information is, thereafter, usable by the mobile computing device 102 to provide personalization in a GUI that is provided via mobile app 107 executing on mobile device 102 (step S108). For example, mobile computing device 102 can access information, including via data processing apparatus 101 and database(s) 108), to provide further personalization in the GUI. For example, images, barcodes, operational information, or other information can be accessed and provided in personalized ways in the GUI. At step S110, the mobile app 107 executes on mobile computing device 102 to provide leveling, alignment, spacing, and/or positioning information associated with the mobile computing device 102. For example, a bubble level is graphically represented, a series of beeps/tones or other voice messages are provided, a numeric value and/or a graphical representation of space is provided, and/or images are provided in the GUI to represent leveling, alignment, spacing, and/or positioning information, as well as augmented reality or overlays to provide additional information for the user. At step S112, the process ends.

Notably, the figures and examples above are not meant to limit the scope of the present disclosure to a single embodiment, as other embodiments are possible by way of interchange of some or all of the described or illustrated elements. Although many of the examples shown and described herein regard picture frames and photographs, the present disclosure is applicable for use in a multitude of other contexts. For examples, builders can use the teachings herein to properly level, align, space, and/or position various surfaces, such as building materials, during construction. Decorators can use the teachings herein to properly level, align, space, and/or position shelving, hangings, and other materials for décor. In other examples, carpenters, surveyors, metalworkers, scientists, or countless other professions require proper leveling, alignment, spacing, and/or positioning, and can use the features shown and described herein, accordingly.

Moreover, where certain elements of the present disclosure can be partially or fully implemented using known components, only those portions of such known components that are necessary for an understanding of the present invention are described, and detailed descriptions of other portions of such known components are omitted so as not to obscure the disclosure. For example, an embodiment showing a singular component should not necessarily be limited to other embodiments including a plurality of the same component, and vice-versa, unless explicitly stated otherwise herein. Moreover, it is not intended for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized system that uses information generated by a mobile computing device to provide leveling information, the system comprising:
   a transmission device configured to transmit at least information that can be received by a mobile computing device that is configured with at least a processor, a communication device, a display screen, and at least one of an accelerometer and a gyroscope, wherein the transmission device is configurable to be coupled to or embedded within an object; and a mobile app configured to execute on the mobile computing device, wherein, when executing by the mobile computing device, the mobile app configures the mobile computing device to:

process the information received from the transmission device to identify the transmission device, the object, or the transmission device and the object;

display a graphical representation in a graphical user interface of a guide for leveling, aligning, spacing, and/or positioning the object, wherein the graphical representation is provided at least in part as a function of augmented reality, and further wherein the augmented reality provides a representation to ensure the objects are level, aligned and equally spaced; and provide, as a function of the at least one of the accelerometer and the gyroscope, a representation that the mobile computing device is determined to be level, wherein the representation that the mobile computing device is level is usable to level the object.

2. The system of claim 1, further wherein, when executing by the mobile computing device, the mobile app configures the mobile computing device to:

receive, from at least one other computing device via the communication device, information associated with the object; and provide a graphical user interface via the display screen that includes at least one representation of the object.

3. The system of claim 1, further wherein, when executing by the mobile computing device, the mobile app configures the mobile computing device to:

identify physical dimensions of the object;

measure a distance between the object and another object; and provide, via a graphical user interface, a representation of the distance.

4. The system of claim 1, further wherein, when executing by the mobile computing device, the mobile app configures the mobile computing device to:

provide at least one audible feedback and haptic feedback when the mobile computing device is determined to be level.

5. The system of claim 1, further wherein, when executing by the mobile computing device, the mobile app configures the mobile computing device to:

operate the mobile app in a suspended mode until the mobile computing device receives the information from the transmission device; and awaken the mobile app automatically upon receiving the information.

6. The system of claim 5, further wherein, when executing by the mobile computing device, the mobile app configures the mobile computing device to:

provide for registration of the object upon an initial awakening of the mobile app.

7. The system of claim 1, wherein the transmission device is a near field communication tag or a radio frequency identification tag.

8. The system of claim 1, wherein the transmission device includes a passive transmitter or an active transmitter.

9. The system of claim 1, wherein the augmented reality superimposes virtual frames for gallery wall planning and marketing.

10. A computerized method that uses information generated by a mobile computing device to provide leveling information, the mobile computing device being configured with at least a processor, a communication device, a display screen, and at least one of an accelerometer and a gyroscope, the method comprising:

processing, by the mobile computing device, information received from a transmission device to identify the transmission device, an object, or the transmission device and the object, wherein the transmission device is configured to be coupled to or embedded within the object; and displaying, by the mobile computing device, a graphical representation in a graphical user interface of a guide for leveling, aligning, spacing, and/or positioning the object, wherein the graphical representation is provided at least in part as a function of augmented reality, and further wherein the augmented reality provides a representation to ensure the objects are level, aligned and equally spaced;

providing, as a function of the at least one of the accelerometer and the gyroscope, a representation that the mobile computing device is determined to be level, wherein the representation that the mobile computing device is level is usable to level the object.

11. The method of claim 10, further comprising:

identifying, by the mobile computing device, physical dimensions of the object;

measuring, by the mobile computing device, a distance between the object and another object; and providing, via a graphical user interface, a representation of the distance.

12. The method of claim 10, further comprising:

operating, by the mobile computing device, the mobile app in a suspended mode until the mobile computing device receives the information from the transmission device; and awakening, by the mobile computing device, the mobile app automatically upon receiving the information.

13. The system of claim 10, wherein the augmented reality superimposes virtual frames for gallery wall planning and marketing.

14. The method of claim 10, further comprising providing, by the mobile computing device, a graphical user interface via the display screen that includes at least one representation of the object.

* * * * *